United States Patent
Kanetaka et al.

(10) Patent No.: US 9,261,686 B2
(45) Date of Patent: Feb. 16, 2016

(54) ZOOM LENS AND IMAGING APPARATUS

(71) Applicant: Sony Corporation, Tokyo (JP)

(72) Inventors: Fumikazu Kanetaka, Chiba (JP); Kodai Nagamatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/447,842

(22) Filed: Jul. 31, 2014

(65) Prior Publication Data

US 2015/0077859 A1  Mar. 19, 2015

(30) Foreign Application Priority Data

Sep. 17, 2013  (JP) ................................. 2013-192194

(51) Int. Cl.
 *G02B 15/14* (2006.01)
 *G02B 15/177* (2006.01)

(52) U.S. Cl.
 CPC .................................. *G02B 15/177* (2013.01)

(58) Field of Classification Search
 CPC ....................................................... G02B 15/14
 USPC ........................................................ 359/686
 See application file for complete search history.

(56) References Cited

U.S. PATENT DOCUMENTS

2012/0257285 A1* 10/2012 Kuzuhara et al. ............. 359/686
2014/0132790 A1*  5/2014 Takahashi et al. ......... 348/220.1

FOREIGN PATENT DOCUMENTS

JP  2012-058406  3/2012
JP  2012-133230  7/2012

* cited by examiner

*Primary Examiner* — William Choi
(74) *Attorney, Agent, or Firm* — Michael Best & Friedrich LLP

(57) ABSTRACT

A zoom lens includes first to fourth lens groups having negative, positive, negative, and positive refractive power, respectively, and arranged in order from an object side. The first lens group includes negative lenses. The fourth lens group is configured of one positive lens. A zooming operation from wide end to telephoto end allows the first to third lens groups to travel along an optical axis, and allows the fourth lens group to be fixed. A focusing operation allows the third lens group to travel along the optical axis. The conditional expressions $1<(R1a+R1b)/(R1a-R1b)<5$ and $2<(R4a+R4b)/(R4a31 R4b)<7$ are satisfied where R1a and R1b are curvature radii on the object side and on the image side of a most-object-sided negative lens in the first lens group, respectively, and R4a and R4b are curvature radii on the object side and on the image side of the positive lens in the fourth lens group, respectively.

10 Claims, 13 Drawing Sheets

ZOOM LENS AND IMAGING APPARATUS

CROSS REFERENCE TO RELATED APPLICATIONS

This application claims the benefit of Japanese Priority Patent Application JP 2013-192194 filed Sep. 17, 2013, the entire contents of each which are incorporated herein by reference.

BACKGROUND

Present disclosure relates to a zoom lens and to an imaging apparatus that includes a zoom lens. Specifically, the present disclosure relates to a zoom lens that is suitably used in an electronic camera such as a digital video camcorder and a digital still camera and has reduced size and improved performance. The present disclosure also relates to an imaging apparatus that includes such a zoom lens.

Recently, a digital camcorder, a digital still camera, etc. that use a solid-state imaging device such as a CCD (Charge Coupled Device) and a CMOS (Complementary Metal-Oxide Semiconductor) have been spread rapidly. Such spread of the digital camera, etc. has led to increasing demand for a zoom lens that has high mobility and high performance suitable for the large number of pixels.

In particular, a user has been expecting to have, at a reasonable price, a compact and high-performance zoom lens that has a half angle of view in a wide end state of around 37 degrees, a zoom magnification of about 2.5, and an open F-number of about F3.5. In a negative-positive-negative-positive zoom type in which a negative lens group, a positive lens group, a negative lens group, and a positive lens group are arranged in order from an object side, a front lens diameter (a diameter of a most-object-sided lens) is easier to be reduced, and off-axial aberration is favorably corrected by arranging the negative lens groups in the front and the back of an aperture. Also, such a zoom type is known as a zoom type that matches the above-described user's needs since the most-image-sided positive lens group suppresses an angle of off-axial light rays entering an imaging plane, and shading is reduced in the wide end state (for example, see Japanese Unexamined Patent Application Publication Nos. 2012-58406 (JP2012-58406A) and 2012-133230 (JP2012-133230A)).

SUMMARY

A zoom lens disclosed in JP2012-58406A has long total optical length, and is not sufficient in compactness. On the other hand, a zoom lens disclosed in JP2012-133230A adopts aspherical lenses for a most-object-sided negative lens group and a most-image-sided positive lens group, and thereby the total length is reduced. However, since both of the most-object-sided negative lens group and the most-image-sided positive lens group are away from an aperture, lens diameters thereof are large, which leads to high cost when aspherical lenses are adopted therefor.

It is desirable to provide a zoom lens capable of achieving reduction in size and in cost while having favorable optical performance, and to provide an imaging apparatus provided with such a zoom lens.

According to an embodiment of the present disclosure, there is provided a zoom lens including: a first lens group having negative refractive power and including a plurality of negative lenses; a second lens group having positive refractive power; a third lens group having negative refractive power; and a fourth lens group having positive refractive power and configured of one positive lens. The first to fourth lens groups are arranged in order from an object side toward an image side. A zooming operation from wide end to telephoto end allows the first to third lens groups to travel along an optical axis, and allows the fourth lens group to be fixed. A focusing operation allows the third lens group to travel along the optical axis. The following conditional expressions are satisfied, $$1 < (R1a + R1b)/(R1a - R1b) < 5 \qquad (1)$$

$$2 < (R4a + R4b)/(R4a - R4b) < 7 \qquad (2)$$

where $R1a$ is a curvature radius on the object side of a most-object-sided negative lens in the first lens group, $R1b$ is a curvature radius on the image side of the most-object-sided negative lens in the first lens group, $R4a$ is a curvature radius on the object side of the positive lens in the fourth lens group, and $R4b$ is a curvature radius on the image side of the positive lens in the fourth lens group.

According to an embodiment of the present disclosure, there is provided an imaging apparatus including a zoom lens, and an imaging device configured to output an imaging signal based on an optical image formed by the zoom lens. The zoom lens includes: a first lens group having negative refractive power and including a plurality of negative lenses; a second lens group having positive refractive power; a third lens group having negative refractive power; and a fourth lens group having positive refractive power and configured of one positive lens. The first to fourth lens groups are arranged in order from an object side toward an image side. A zooming operation from wide end to telephoto end allows the first to third lens groups to travel along an optical axis, and allows the fourth lens group to be fixed. A focusing operation allows the third lens group to travel along the optical axis. The following conditional expressions are satisfied, $$1 < (R1a + R1b)/(R1a - R1b) < 5 \qquad (1)$$

$$2 < (R4a + R4b)/(R4a - R4b) < 7 \qquad (2)$$

where $R1a$ is a curvature radius on the object side of a most-object-sided negative lens in the first lens group, $R1b$ is a curvature radius on the image side of the most-object-sided negative lens in the first lens group, $R4a$ is a curvature radius on the object side of the positive lens in the fourth lens group, and $R4b$ is a curvature radius on the image side of the positive lens in the fourth lens group.

In the zoom lens and the imaging apparatus according to the above-described embodiments of the present disclosure, the zooming operation from the wide end to the telephoto end allows the first to third lens groups to travel along the optical axis. The focusing operation allows the third lens group to travel along the optical axis. Each of the first to fourth lens groups is optimized in configuration so as to achieve reduction in size and in cost while achieving favorable optical performance.

According to the zoom lens and the imaging apparatus according to the above-described embodiments of the present disclosure, each of the first to fourth lens groups is optimized in configuration. Therefore, it is possible to achieve reduction in size and in cost while achieving favorable optical performance. For example, it is possible to achieve performance that achieves a half angle of view in the wide end state of around 37 degrees, a zoom magnification of about 2.5, and an open F-number of about F3.5.

It is to be noted that effects of the present disclosure are not limited to the effects described above, and may be any of the effects described in the present disclosure.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Some embodiments of the present disclosure will be described below in detail with reference to the drawings. The description will be provided in the following order.
1. Basic Configuration of Lens
2. Functions and Effects
3. Example of Application to Imaging Apparatus
4. Numerical Examples of Lenses
5. Other Embodiments
[1. Basic Configuration of Lens]

Figure 1:
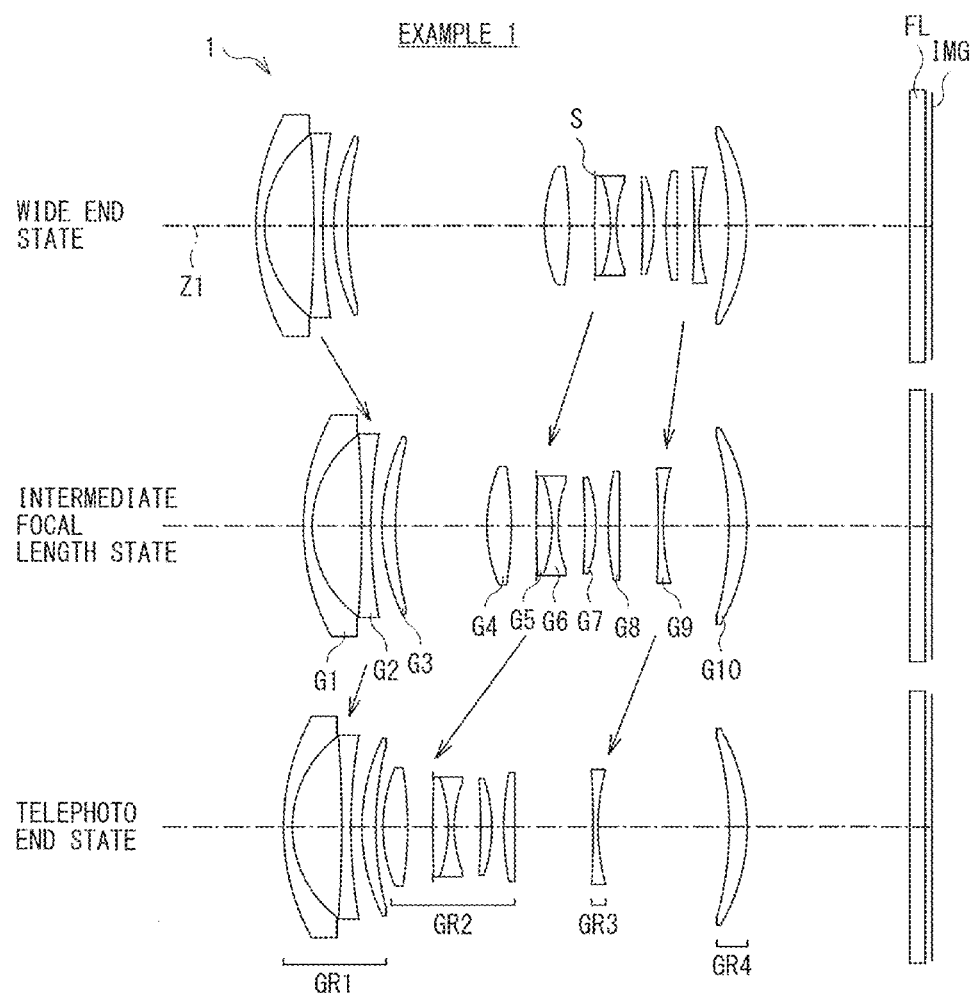
FIG. 1 is a lens cross-sectional view illustrating a first configuration example of a zoom lens according to an embodiment of the present disclosure.
Figure 5:
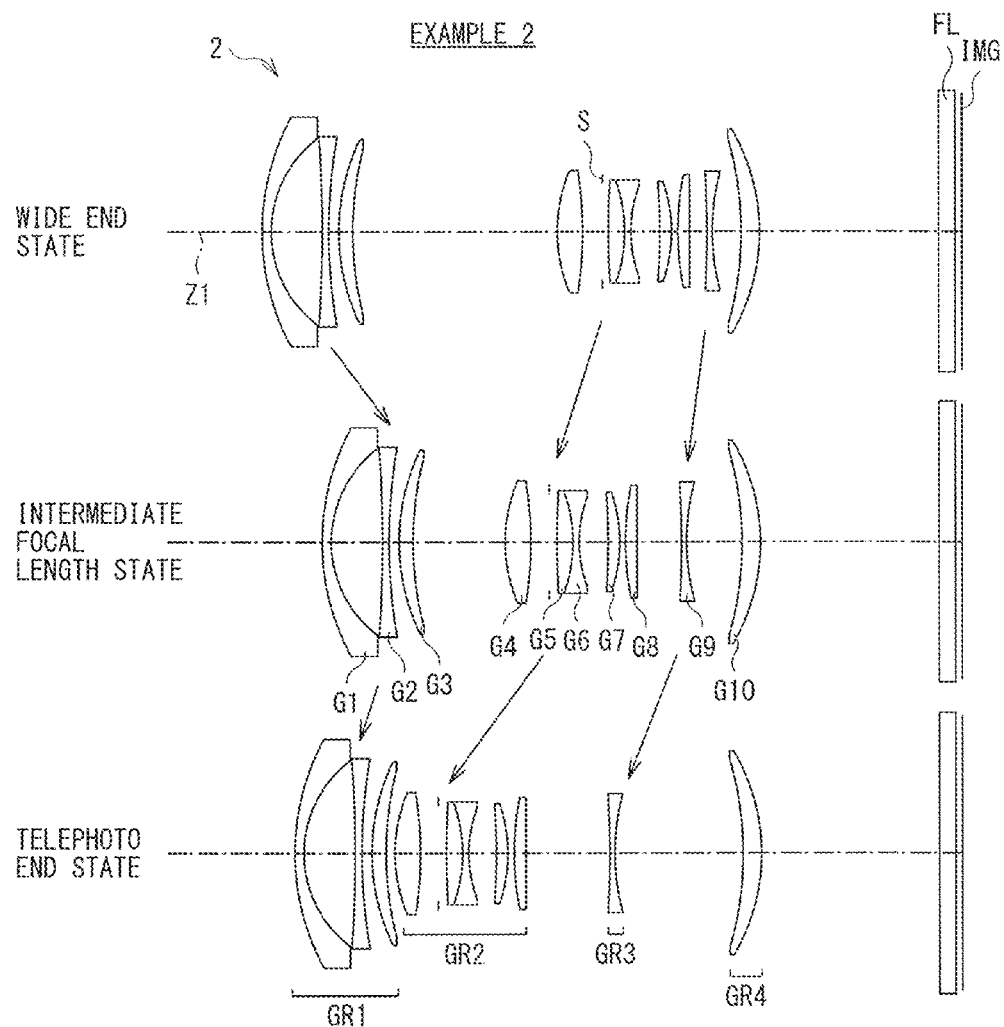
FIG. 5 is a lens cross-sectional view illustrating a second configuration example of the zoom lens.
Figure 9:
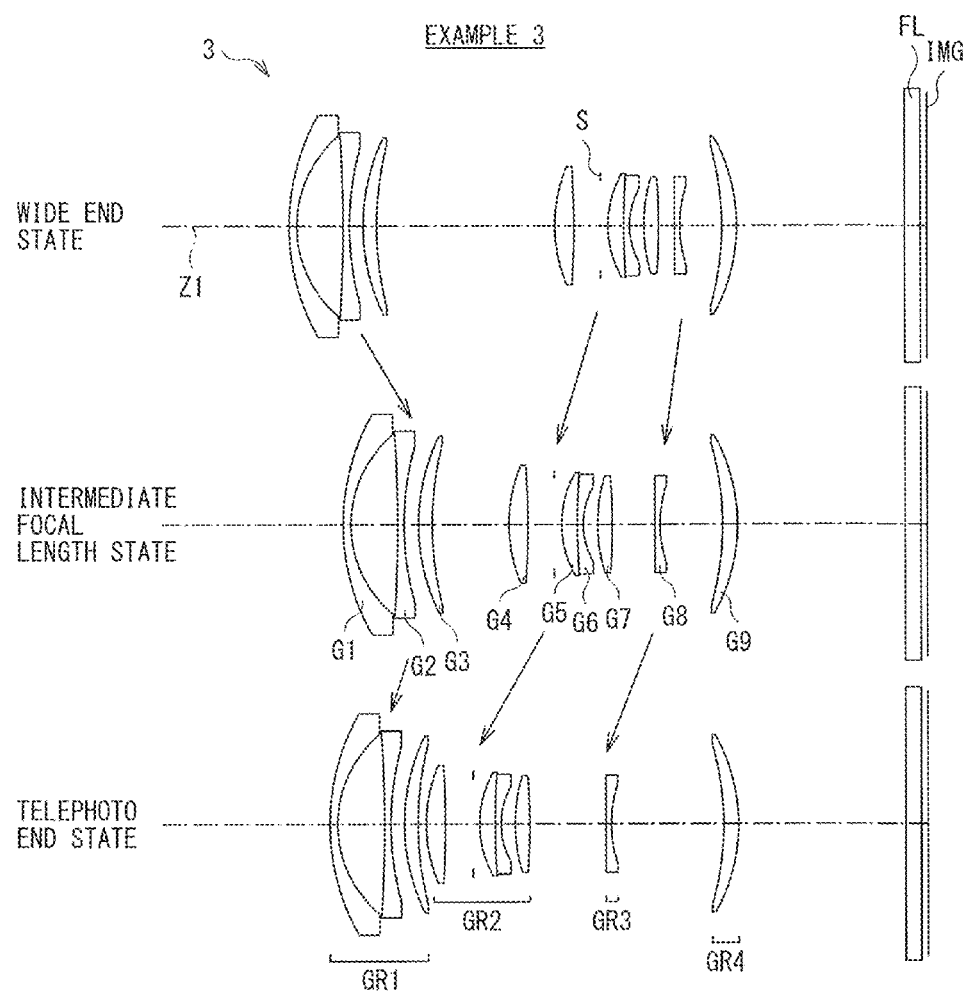
FIG. 9 is a lens cross-sectional view illustrating a third configuration example of the zoom lens.
Figure 13:
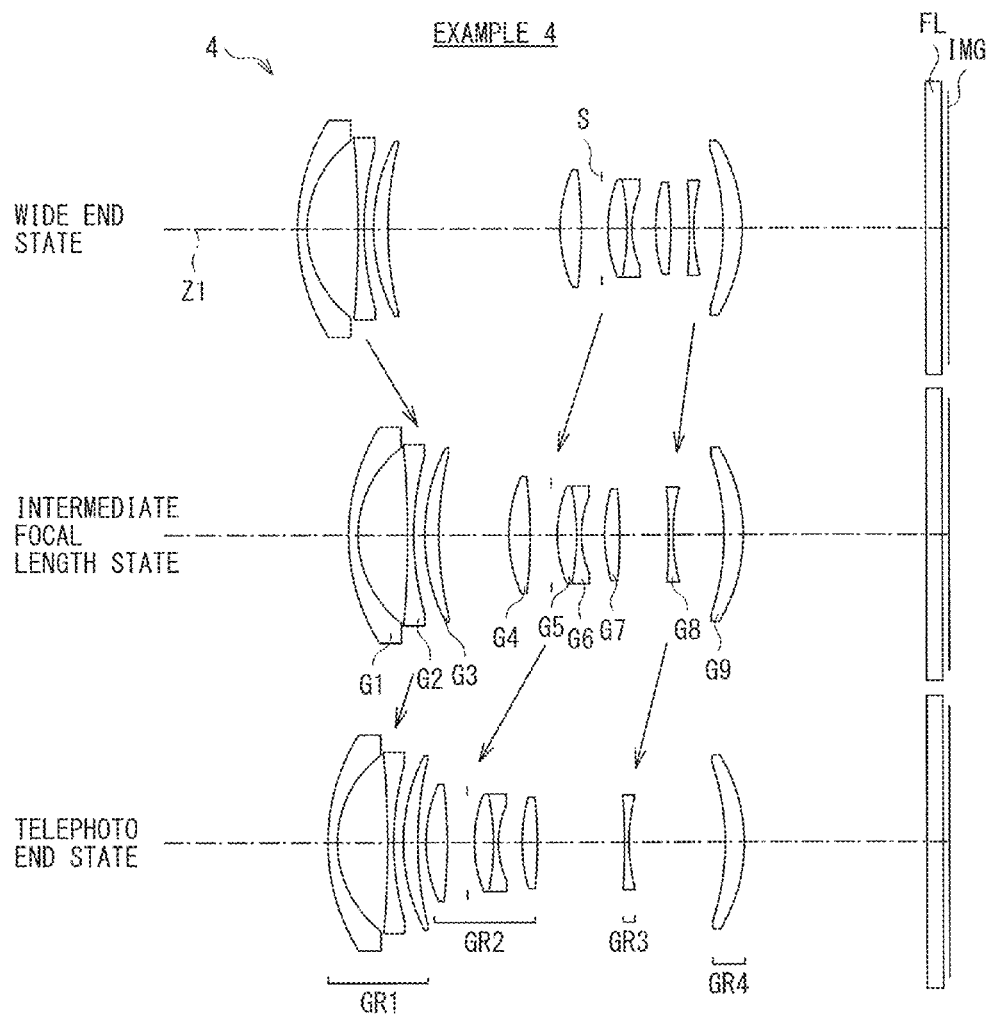
FIG. 13 is a lens cross-sectional view illustrating a fourth configuration example of the zoom lens.

FIG. 1 illustrates a first configuration example of a zoom lens according to an embodiment of the present disclosure. FIG. 5 illustrates a second configuration example of the zoom lens. FIG. 9 illustrates a third configuration example of the zoom lens. FIG. 13 illustrates a fourth configuration example of the zoom lens. Numerical examples in which specific numerical values are applied to the above-mentioned configuration examples will be described later. In FIG. 1, etc., a symbol IMG represents image plane, and a symbol Z1 represents an optical axis. Optical members such as a sealant glass for protecting an imaging device and various optical filters (for example, a filter FL) may be disposed between the zoom lens and the image plane IMG.

The configuration of the zoom lens according to the present embodiment will be described below in appropriate correspondence with the configuration examples shown in FIG. 1, etc. However, the technology according to the present disclosure is not limited to the illustrated configuration examples.

The zoom lens according to the present embodiment is substantially configured of four lens groups in which a first lens group GR1, a second lens group GR2, a third lens group GR3, and a fourth lens group GR4 are arranged in order from the object side along the optical axis Z1. The first lens group GR1 has negative refractive power. The second lens group GR2 has positive refractive power. The third lens group GR3 has negative refractive power. The fourth lens group GR4 has positive refractive power.

In each of FIGS. 1, 5, 9, and 13, an upper part, a middle part, and a lower part show positions of lenses in a wide end state, in an intermediate focal length state, and in a telephoto end state, respectively. The lenses travel to the positions shown by arrows in accordance with a zooming operation from wide end to telephoto end. Solid arrows show movement in the zooming operation. As shown in FIG. 1, etc., in the zoom lens according to the present embodiment, the first lens group GR1, the second lens group GR2, and the third lens group GR3 travel along the optical axis and the fourth lens group GR4 is fixed when the zooming operation from the wide end to the telephoto end is performed. The third lens group GR3 travels along the optical axis when a focusing operation is performed.

In the zoom lens according to the present embodiment, the first lens group GR1 includes a plurality of negative lenses. The fourth lens group GR4 is configured of one positive lens.

Further, the zoom lens according to the present embodiment may desirably satisfy predetermined conditional expressions, etc. which will be described later.

[2. Functions and Effects]

Next, functions and effects of the zoom lens according to the present embodiment will be described. Also, a favorable configuration of the zoom lens according to the present embodiment will be described.

It is to be noted that the effects described in the present specification are mere examples. The effects of the present disclosure are not limited thereto and may include other effects.

By allowing the zoom lens to be configured of four lens groups of negative, positive, negative, and positive as described above, the adjacent lens groups have power of opposite signs. Therefore, it is easier to improve a magnification effect resulting from traveling of the lenses, and also, the zoom lens becomes advantageous in reduction in a front lens diameter (a diameter of a most-object-sided lens). Since the most-image-sided fourth lens group GR4 is a positive group, an angle of off-axial light rays entering an imaging plane is suppressed, and shading in the wide end state is reduced. Since the fourth lens group GR4 is arranged at a most-image-sided position, a lens diameter thereof is likely to be large. Allowing the fourth lens group GR4 to be configured of one fixed positive lens contributes to simplification of a lens barrel configuration and reduction in cost thereof.

The zoom lens according to the present embodiment may desirably satisfy the following Conditional expressions (1) and (2), $$1<(R1a+R1b)/(R1a-R1b)<5 \quad (1)$$

$$2<(R4a+R4b)/(R4a-R4b)<7 \quad (2)$$

where $R1a$ is a curvature radius on the object side of a most-object-sided negative lens in the first lens group GR1, $R1b$ is a curvature radius on the image side of the most-object-sided negative lens in the first lens group GR1, $R4a$ is a curvature radius on the object side of the positive lens in the fourth lens group GR4, and $R4b$ is a curvature radius on the image side of the positive lens in the fourth lens group GR4.

Conditional expression (1) defines a preferable shape of the most-object-sided negative lens in the first lens group GR1 for favorably correcting spherical aberration in the telephoto end state. When a value of $(R1a+R1b)/(R1a-R1b)$ is smaller than a lower limit value in Conditional expression (1), curvatures of both surfaces of the most-object-sided negative lens are small (absolute values of curvature radii thereof are large), and therefore, the aspherical aberration in the telephoto end state is excessively in an under correction state. When the value of $(R1a+R1b)/(R1a-R1b)$ is larger than an upper limit value in Conditional expression (1), the curvatures of both surfaces of the most-object-sided negative lens are large (absolute values of curvature radii thereof are small), and therefore, the aspherical aberration in the telephoto end state is excessively in an over correction state.

Conditional expression (2) defines a preferable shape of the positive lens in the fourth lens group GR4 for favorably correcting field curvature. When a value of $(R4a+R4b)/(R4a-R4b)$ is smaller than a lower limit value in Conditional expression (2), curvatures of both surfaces of the positive lens in the fourth lens group GR4 are small, and therefore, an effect of correcting the field curvature in a minus direction is weakened. When the value of $(R4a+R4b)/(R4a-R4b)$ is larger than an upper limit value in Conditional expression (2), the curvatures of both surfaces of the positive lens in the fourth lens group GR4 are large, and therefore, the effect of correcting the field curvature in the minus direction is excessively exhibited.

Accordingly, by allowing the zoom lens to satisfy the above-described basic configuration and Conditional expressions (1) and (2), the spherical aberration and the field curvature are corrected appropriately. Therefore, it is possible to achieve reduction in size and in cost while achieving favorable optical performance.

It is to be noted that it may be more preferable that a numerical range of Conditional expression (1) has the lower limit value of 2 and the upper limit value of 4 as in the following Conditional expression (1)'. It may be more preferable that a numerical range of Conditional expression (2) has the lower limit value of 3 and the upper limit value of 6 as in the following Conditional expression (2)'.

$$2<(R1a+R1b)/(R1a-R1b)<4 \quad (1)'$$

$$3<(R4a+R4b)/(R4a-R4b)<6 \quad (2)'$$

Moreover, the zoom lens according to the present embodiment may desirably satisfy the following Conditional expression (3), $$0.5<|f2/f3|<0.9 \quad (3)$$

where f2 is a focal length of the second lens group GR2, and f3 is a focal length of the third lens group GR3.

Conditional expression (3) defines a favorable power ratio of the second lens group GR2 and the third lens group GR3 for achieving reduction in size while favorably correcting the spherical aberration and comma aberration. When a value of |f2/f3| is smaller than a lower limit value in Conditional expression (3), the power of the second lens group GR2 is excessively strong, and therefore, it may be difficult to correct the spherical aberration, the comma aberration, etc. Alternatively, the power of the third lens group GR3 is weak and a stroke of focusing becomes long. Therefore, the total length of the lens becomes long, which prevents reduction in size. Conversely, when the value of |f2/f3| is larger than an upper limit value in Conditional expression (3), the power of the second lens group GR2 is excessively weak and a travel amount of the second lens group GR2 increases. Therefore, it may be difficult to achieve reduction in size. Alternatively, the power of the third lens group GR3 is excessively strong and variation in the field curvature resulting from a focusing operation increases, and accordingly, optical performance in short-distance shooting may be lowered.

Accordingly, by allowing the zoom lens to satisfy Conditional expression (3), the power and the travel amount of each of the second lens group GR2 and the third lens group GR3 are optimized. Therefore, the zoom lens becomes advantageous in reduction in size while favorably correcting the spherical aberration and the comma aberration.

It is to be noted that it may be more preferable that a numerical range of Conditional expression (3) has the lower limit value of 0.6 and the upper limit value of 0.8 as in the following Conditional expression (3)'.

$$0.6<|f2/f3|<0.8 \quad (3)'$$

Moreover, the zoom lens according to the present embodiment may desirably satisfy the following Conditional expression (4), $$0.2<|f3/f4|<0.6 \quad (4)$$

where f4 is a focal length of the fourth lens group GR4.

Conditional expression (4) defines a preferable power ratio of the third lens group GR3 and the fourth lens group GR4 for achieving reduction in size while favorably correcting off-axial aberration. When a value of |f3/f4| is smaller than a lower limit value in Conditional expression (4), the power of the third lens group GR3 is excessively strong and variation in the field curvature resulting from the focusing operation increases. Accordingly, the optical performance in short-distance shooting may be lowered. Alternatively, the power of the fourth lens group GR4 is excessively weak, and correction of distortion and the field curvature may be insufficient. Conversely, when the value of |f3/f4| is larger than the upper limit value in Conditional expression (4), the power of the third lens group GR3 is excessively weak and the stroke of focusing becomes long. Accordingly, the total length of the lens is long. Alternatively, the power of the fourth lens group GR4 is excessively strong, and sufficient backfocus may not be secured.

Accordingly, by allowing the zoom lens to satisfy Conditional expression (4), the power and the travel amount of the third lens group GR3 and the power of the fourth lens group GR4 are optimized. Therefore, the zoom lens becomes advantageous in reduction in size while favorably correcting the off-axial aberration.

It is to be noted that it may be more preferable that a numerical range of Conditional expression (4) has the lower limit value of 0.3 and the upper limit value of 0.4 as in the following Conditional expression (4)'.

$$0.3<|f3/f4|<0.4 \quad (4)'$$

Moreover, the zoom lens according to the present embodiment may desirably satisfy the following Conditional expression (5), $$1<|f1/f2|<2 \quad (5)$$

where f1 is a focal length of the first lens group G1.

Conditional expression (5) defines a preferable power ratio of the first lens group GR1 and the second lens group GR2 for achieving reduction in size while favorably correcting the spherical aberration and the comma aberration. When a value of |f1/f2| is smaller than a lower limit value in Conditional expression (5), the power of the first lens group GR1 is excessively strong, and a height of light rays entering the second lens group GR2 is excessively high. Therefore, it may be difficult to correct the spherical aberration, the comma aberration, etc. Alternatively, when the power of the second lens group GR2 is weak, the travel amount of the second lens group GR2 increases, and reduction in size may be difficult. Conversely, when the value of |f1/f2| is larger than an upper limit value in Conditional expression (5), the power of the first lens group GR1 is excessively weak, and therefore, it may be difficult to reduce the total length. Alternatively, the power of the second lens group GR2 is excessively strong, and therefore, it may be difficult to correct the spherical aberration, the comma aberration, etc.

Accordingly, by allowing the zoom lens to satisfy Conditional expression (5), the power and the travel amount of each of the first lens group G1 and the second lens group GR2 are optimized. Therefore, the zoom lens becomes advantageous in reduction in size while favorably correcting the spherical aberration and the comma aberration.

It is to be noted that it may be more preferable that a numerical range of Conditional expression (5) has the lower limit value of 1.3 and the upper limit value of 1.5 as in the following Conditional expression (5)'.

$$1.3<|f1/f2|<1.5 \quad (5)'$$

Moreover, in the zoom lens according to the present embodiment, the third lens group GR3 may be desirably configured of one negative lens. By allowing the third lens group GR3 to be configured of one negative lens, the focusing lens is reduced in weight. Accordingly, the zoom lens becomes advantageous in reduction of load on an actuator that drives the lens and in increase in speed of the focusing operation.

Moreover, in the zoom lens according to the present embodiment, an aperture (an aperture stop S) that adjusts a light amount may be desirably provided in the second lens group GR2. By providing the aperture that adjusts the light amount in the second lens group GR2, heights of light rays passing through the first lens group GR1 and the fourth lens group GR4 are optimized. Therefore, the zoom lens becomes advantageous in improvement in performance in the telephoto end state. Moreover, the zoom lens becomes advantageous in reduction in the front lens diameter and reduction in size of the lens barrel.

Moreover, in the zoom lens according to the present embodiment, the positive lens in the fourth lens group GR4 may be desirably configured of a spherical lens, and all of lens surfaces thereof may be desirably spherical. Generally, it is known that an aspherical lens has higher aberration correction effect, but remarkably increases cost as a lens diameter thereof increases. By allowing the positive lens in the fourth lens group GR4 to be configured of a spherical lens, it is possible to suppress a cost of the fourth lens group GR4 to be low that is away from the aperture and tends to have a large lens diameter.

Moreover, in the zoom lens according to the present embodiment, the first lens group GR1 may be desirably configured only of spherical lenses, and all of the lens surfaces thereof may be desirably spherical. By allowing the first lens group GR1 to be configured only of spherical lenses, it is possible to suppress a cost of the first lens group GR1 that is away from the aperture and tends to have a large lens diameter.

Moreover, in the zoom lens according to the present embodiment, the first lens group GR1 may be desirably configured of three lenses that are a first negative lens, a second negative lens, and a positive lens that are arranged in order from the object side. By allowing the first lens group GR1 to be configured of such three lenses, the first lens group GR1 as a whole achieves strong negative power, and the zoom lens becomes advantageous in correction of the field curvature and the comma aberration in the wide end state. This contributes to reduction in size and to improvement in performance.

Moreover, the zoom lens according to the present embodiment may desirably satisfy the following Conditional expression (6), $$3<L\max/Y<7 \quad (6)$$

where Lmax is a maximum value of the total length of the zoom lens in a range from the wide end state to the telephoto end state, and Y is a maximum image height.

Conditional expression (6) defines a preferable ratio of the maximum value of the total length of the zoom lens in the range from the wide end state to the telephoto end state, and the maximum image height, for reducing the size of the lens barrel. When a value of Lmax/Y is smaller than a lower limit value in Conditional expression (6), it may be necessary to excessively increase power of each of the lens groups. Accordingly, eccentricity error sensitivity of each of the lens groups may increase and difficulty in manufacturing may increase. Accordingly, a manufacturing cost may also increase. Conversely, when the value of Lmax/Y is larger than an upper limit value in Conditional expression (6), the total length of the lens system is excessively large. Accordingly, it may be difficult to achieve reduction in size.

Accordingly, by allowing the zoom lens to satisfy Conditional expression (6), the zoom lens becomes advantageous in reduction in size of the lens barrel.

It is to be noted that it may be more preferable that a numerical range of Conditional expression (6) has the lower limit value of 4.5 and the upper limit value of 5.5 as in the following Conditional expression (6)'.

$$4.5 < L\max/Y < 5.5 \quad (6)'$$

[3. Example of Application to Imaging Apparatus]

Figure 17:
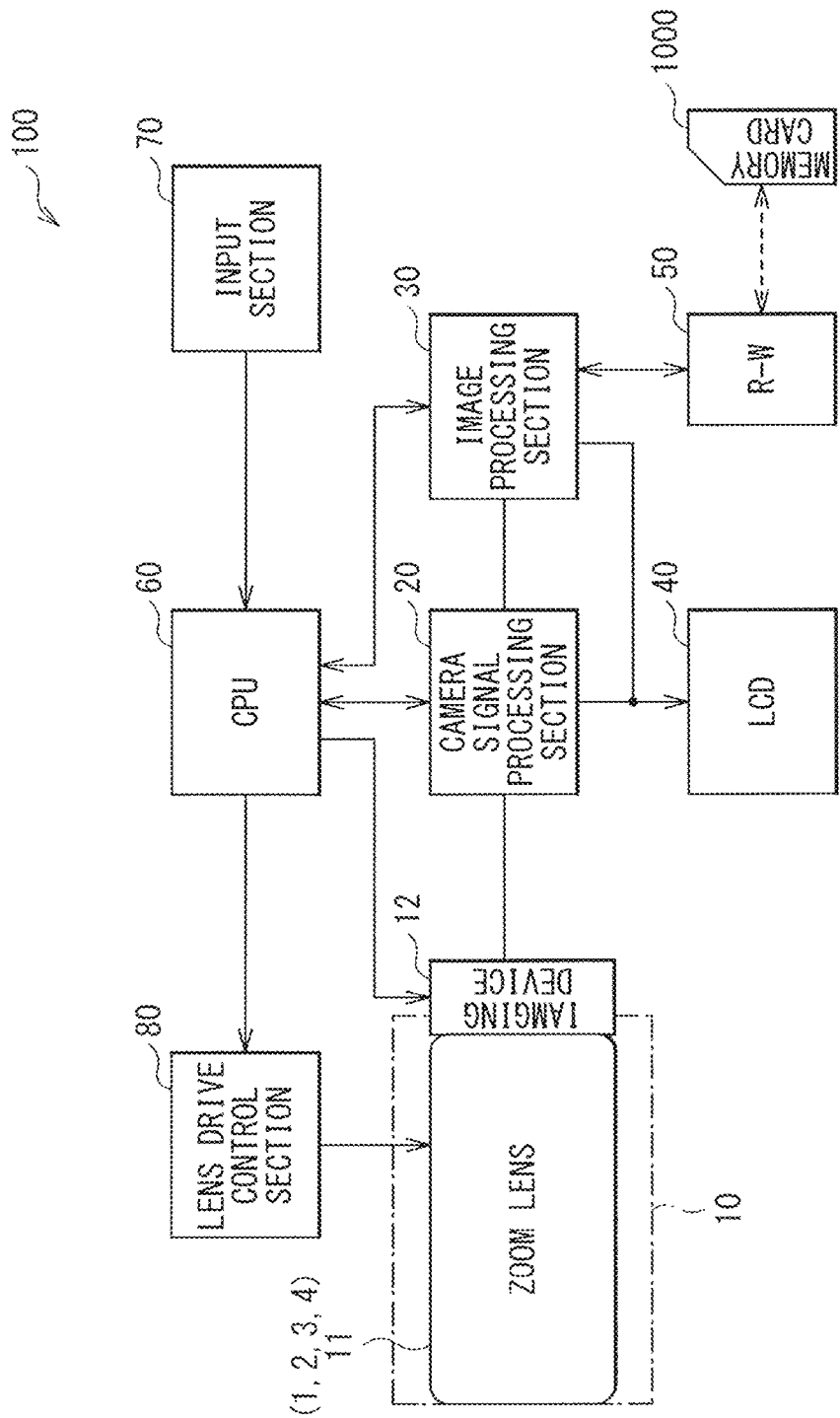
FIG. 17 is a block diagram illustrating a configuration example of an imaging apparatus.

FIG. 17 illustrates a configuration example of an imaging apparatus 100 to which the zoom lens according to the present embodiment is applied. The imaging apparatus 100 may be, for example, a digital still camera. The imaging apparatus 100 may include, a camera block 10, a camera signal processing section 20, an image processing section 30, an LCD (Liquid Crystal Display) 40, a R-W (Reader-Writer) 50, a CPU (Central Processing Unit) 60, an input section 70, and a lens drive control section 80.

The camera block 10 has an imaging function. The camera block 10 includes an optical system including a zoom lens 11 as an imaging lens, and an imaging device 12 such as a CCD (Charge Coupled Device) and a CMOS (Complementary Metal Oxide Semiconductor). The imaging device 12 outputs an imaging signal (an image signal) based on an optical image by converting the optical image formed by the zoom lens 11 into an electric signal. As the zoom lens 11, any of the zoom lenses 1, 2, 3, and 4 in the configuration examples shown in FIGS. 1, 5, 9, and 13, respectively, is applicable.

The camera signal processing section 20 performs, on the image signal outputted from the imaging device 12, various signal processes such as an analog-to-digital conversion, noise removal, image quality correction, conversion into a luminance-color-difference signal.

The image processing section 30 performs recording and reproducing processes on the image signal. The image processing section 30 performs processes such as a compression-encoding/extension-decoding process on the image signal based on a predetermined image data format, and a conversion process on data specification such as resolution.

The LCD 40 has a function of displaying various data including, for example, an operation state of a user with respect to the input section 70 and shot images. The R-W 50 writes, in the memory card 1000, image data encoded by the image processing section 30 and reads the image data written in the memory card 1000. The memory card 1000 may be, for example, a semiconductor memory attachable to and detachable from a slot connected to the R-W 50.

The CPU 60 serves as a control processing section that controls each circuit block provided in the imaging apparatus 100. The CPU 60 controls each circuit block based on, for example, an instruction input signal from the input section 70, etc. The input section 70 is configured of components such as various switches by which necessary operations are performed by a user. The input section 70 may be configured, for example, of a shutter release button for performing a shutter operation, a selection switch for selecting operation modes, etc. The input section 70 outputs, to the CPU 60, an instruction input signal in accordance with the operation by the user. The lens drive control section 80 controls driving of lenses arranged in the camera block 10. The lens drive control section 80 may control, for example, an unillustrated motor that drives each lens in the zoom lens 11 based on a control signal from the CPU 60.

Description will be given below of operations in the imaging apparatus 100.

In a standby state for shooting, under control by the CPU 60, an image signal of an image shot in the camera block 10 is outputted to the LCD 40 via the camera signal processing section 20 to be displayed as a camera-through image. Further, for example, when the input section 70 inputs an instruction input signal for a zooming operation, a focusing operation, etc., the CPU 60 outputs a control signal to the lens drive control section 80, and predetermined lenses in the zoom lens 11 travel based on the control by the lens drive control section 80.

When an unillustrated shutter of the camera block 10 operates in response to the instruction input signal from the input section 70, the camera signal processing section 20 outputs the shot image signal to the image processing section 30. The image processing section 30 performs a compression encoding process on the image signal and converts the image signal into digital data of a predetermined data format. The image processing section 30 outputs the converted data to the R-W 50 and the R-W 50 writes the converted data in the memory card 1000.

It is to be noted that the focusing operation may be performed, for example, through allowing the predetermined lenses in the zoom lens 11 to travel by the lens drive control section 80 in response to the control signal from the CPU 60, for example, when the shutter release button of the input section 70 is pressed halfway or when the shutter release button is fully pressed for recording (shooting).

When reproducing the image data recorded in the memory card 1000, the R-W 50 reads predetermined image data from the memory card 1000 in response to the operation with respect to the input section 70. The image processing section 30 performs an extension decoding process on the image data and outputs a reproduction image signal to the LCD 40. Thus, the reproduction image is displayed.

It is to be noted that, although the example in which the imaging apparatus is applied to a digital still camera has been described in the above embodiment, a range of applications of the imaging apparatus is not limited to digital still cameras, and other various electronic apparatuses may be the possible specific applications of the imaging apparatus 100. For example, the imaging apparatus 100 is widely applicable as a camera section, etc. of a digital input-output apparatus such as a digital video camcorder, a mobile phone provided with a camera, and a PDA (personal digital assistant) provided with a camera.

EXAMPLES

[4. Numerical Examples of Lenses]

Next, description will be given of specific numerical examples of the zoom lens according to the present embodiment. Description will be given of numerical examples in which specific numerical values are applied to the zoom lenses 1, 2, 3, and 4 in the configuration examples shown in FIGS. 1, 5, 9, and 13, respectively.

Symbols etc. in tables and the description below represent the following. "Surface number" represents a number that represents an i-th surface counted from the most object side. "Curvature radius" represents a value (mm) of a paraxial curvature radius of the i-th surface. "Spacing" represents a value (mm) of a spacing along the optical axis between the i-th surface and the (i+1)th surface. Concerning the spacing, a spacing variable in accordance with a zooming operation is descried as "Di". "Refractive index" represents a value of a refractive index of a d-line (having a wavelength of 587.6 nm) of a material of an optical member that has the i-th surface. "Abbe number" represents a value of an Abbe number, with respect to the d-line, of the material of the optical member that has the i-th surface. A value of "∞" in "curvature radius" indicates that the relevant surface is a planar surface or an aperture surface (an aperture stop S). "STO" in "surface number" indicates that the relevant surface is the aperture stop S. "f" represents a total focal length of the lens system. "Fno" represents an F number. "ω" represents a half angle of view.

Some lenses used in the numerical examples have an aspherical lens surface. "ASP" in "surface number" indicates that the relevant surface is aspherical. The aspherical surface has a shape that is defined by the following expression of aspherical surface, where "x" is a distance (sag amount) from a vertex of the lens surface along the optical axis, "y" is a height (an image height) in a direction perpendicular to the optical axis, "c" is a paraxial curvature at the vertex of the lens (a reciprocal of the curvature radius), "K" is a conic constant. "A", "B", "C", and "D" are aspherical surface coefficients of 4th order, 6th order, 8th order, and 10th order, respectively. It is to be noted that, in the tables below showing the aspherical surface coefficients, "E-i" represents an exponential expression having 10 as a base, i.e., "$10^{-i}$". To give an example, "0.12345E-05" represents "$0.12345 \times 10^{-5}$".

$$x = cy^2/[1+\{1-(1+\kappa)c^2y^2\}^{1/2}] + Ay^4 + By^6 + Cy^8 + Dy^{10}$$
[Expression of Aspherical Surface]

[Configuration Common to Numerical Examples]

Any of the zoom lenses 1, 2, 3, and 4 applied to the numerical examples below has a configuration that satisfies the basic configuration of the lens and the desirable conditions described above. Any of the zoom lenses 1, 2, 3, and 4 is substantially configured of four lens groups in which the first lens group GR1, the second lens group GR2, the third lens group GR3, and the fourth lens group GR4 are arranged in order from the object side. The first lens group GR1 has negative refractive power. The second lens group GR2 has positive refractive power. The third lens group GR3 has negative refractive power. The fourth lens group GR4 has positive refractive power.

The first lens group GR1, the second lens group GR2, and the third lens group GR3 are movable groups, and travels along the optical axis when a zooming operation from the wide end to the telephoto end is performed. When a focusing operation is performed, the third lens group GR3 travels along the optical axis.

Numerical Example 1

In the zoom lens 1 shown in FIG. 1, the first lens group GR1 is configured of a negative meniscus lens G1 having a convex surface facing toward the object side, a negative biconcave lens G2, and a positive meniscus lens G3 having a convex surface facing toward the object side that are arranged in order from the object side toward the image side. The second lens group GR2 is configured of a positive biconvex lens G4, a cemented lens configured of a positive biconvex lens G5 and a negative biconcave lens G6 cemented to each other, a positive meniscus lens G7 having a convex surface facing toward the image side, and a positive meniscus lens G8 having a convex surface facing toward the object side that are arranged in order from the object side toward the image side. The third lens group GR3 is configured of a negative biconcave lens G9. The fourth lens group GR4 is configured of a positive meniscus lens G10 having a convex surface facing toward the image side. A filter FL is arranged between the fourth lens group GR4 and the image plane IMG. The aperture stop S is arranged in the second lens group GR2. The aperture stop S travels together with the second lens group GR2 when the zooming operation is performed.

Table 1 shows lens data of Numerical example 1 in which specific numerical values are applied to the zoom lens 1. In the zoom lens 1, both surfaces (the 7th and 8th surfaces) of the positive lens G4 in the second lens group GR2, both surfaces (the 13th and 14th surfaces) of the positive lens G7, and both surfaces (the 17th and 18th surfaces) of the negative lens G9 in the third lens group GR3 are aspherical. The values of the 4th, 6th, 8th, and 10th aspherical surface coefficients A, B, C, and D of the above-mentioned aspherical surfaces are shown together with the value of the conic constant κ in Table 2.

Table 3 shows values of the total focal length f of the lens system, the F number Fno, and the half angle of view ω in each of the wide end state, the intermediate focal length state, and the telephoto end state. In the zoom lens 1, a spacing D6 between the first lens group GR1 and the second lens group GR2 varies when the zooming operation from the wide end to the telephoto end is performed. Also, a spacing D16 between the second lens group GR2 and the third lens group GR3 varies. Also, a spacing D18 between the third lens group GR3 and the fourth lens group GR4 varies. Table 4 shows the above-mentioned variable spacings together with the total focal length f of the lens system in the wide end state, the intermediate focal length state, and the telephoto end state.

TABLE 1

Example 1

| Lens group | Surface number | Curvature radius | Spacing | Refractive index | Abbe number |
|---|---|---|---|---|---|
| GR1 | 1 | 38.7524 | 1.500 | 1.83480 | 42.72 |
|  | 2 | 19.0709 | 8.365 |  |  |
|  | 3 | -160.2378 | 1.500 | 1.83480 | 42.72 |
|  | 4 | 77.2316 | 1.946 |  |  |
|  | 5 | 34.4849 | 2.295 | 1.92290 | 20.88 |
|  | 6 | 60.0000 | (D6) |  |  |
| GR2 | 7 (ASP) | 24.0640 | 4.207 | 1.69350 | 53.20 |
|  | 8 (ASP) | -50.6135 | 4.141 |  |  |
|  | 9 (STO) | ∞ | 0.000 |  |  |
|  | 10 | 84.9305 | 2.780 | 1.49700 | 81.61 |
|  | 11 | -24.0369 | 1.000 | 1.69900 | 30.05 |
|  | 12 | 22.2058 | 4.500 |  |  |
|  | 13 (ASP) | -126.2352 | 2.041 | 1.68890 | 31.16 |
|  | 14 (ASP) | -24.9430 | 2.000 |  |  |
|  | 15 | 43.7447 | 1.815 | 1.48750 | 70.44 |
|  | 16 | 466.9435 | (D16) |  |  |
| GR3 | 17 (ASP) | -165.0805 | 0.800 | 1.80610 | 40.73 |
|  | 18 (ASP) | 34.9636 | (D18) |  |  |
| GR4 | 19 | -59.1078 | 3.077 | 1.60340 | 38.01 |
|  | 20 | -31.9500 | 27.706 |  |  |
| FL | 21 | ∞ | 2.500 | 1.51680 | 64.20 |
|  | 22 | ∞ | 1.000 |  |  |

TABLE 2

Example 1

| Surface number | κ | A | B | C | D |
|---|---|---|---|---|---|
| 7 | 0.00000E+00 | -8.14565E-06 | -4.14593E-08 | 9.02976E-11 | 0.00000E+00 |
| 8 | 0.00000E+00 | 1.25581E-05 | -5.08445E-08 | 1.69340E-10 | 0.00000E+00 |
| 13 | 0.00000E+00 | -1.00687E-05 | -2.06031E-07 | 1.43491E-09 | 0.00000E+00 |

TABLE 2-continued

Example 1

| Surface number | κ | A | B | C | D |
|---|---|---|---|---|---|
| 14 | 0.00000E+00 | −1.64112E−05 | −1.83252E−07 | 9.62419E−10 | 0.00000E+00 |
| 17 | 0.00000E+00 | 2.92968E−07 | 9.06442E−08 | −3.68272E−10 | 0.00000E+00 |
| 18 | 0.00000E+00 | 1.52580E−05 | 1.90241E−08 | −2.24080E−10 | 0.00000E+00 |

TABLE 3

Example 1

| | Wide end state | Intermediate focal length state | Telephoto end state |
|---|---|---|---|
| f | 28.81 | 43.47 | 72.69 |
| Fno | 3.55 | 4.22 | 5.75 |
| ω | 36.90 | 26.46 | 16.57 |

TABLE 4

Example 1

| | Wide end state | Intermediate focal length state | Telephoto end state |
|---|---|---|---|
| f | 28.81 | 43.47 | 72.69 |
| D6 | 33.780 | 15.762 | 1.200 |
| D16 | 2.998 | 6.724 | 13.235 |
| D18 | 5.048 | 11.203 | 22.519 |

Figure 2:
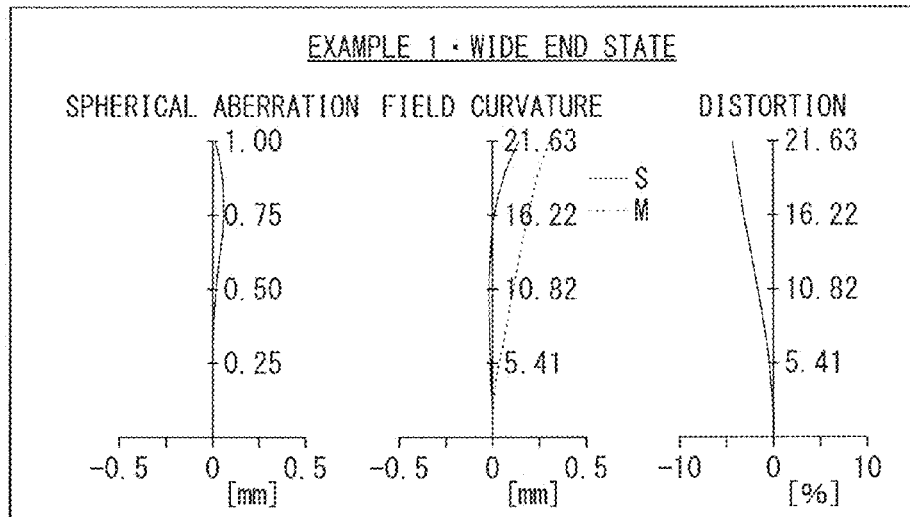
FIG. 2 is an aberration diagram illustrating various aberrations in a wide end state in Numerical example 1 in which specific numerical values are applied to the zoom lens shown in FIG. 1.
Figure 3:
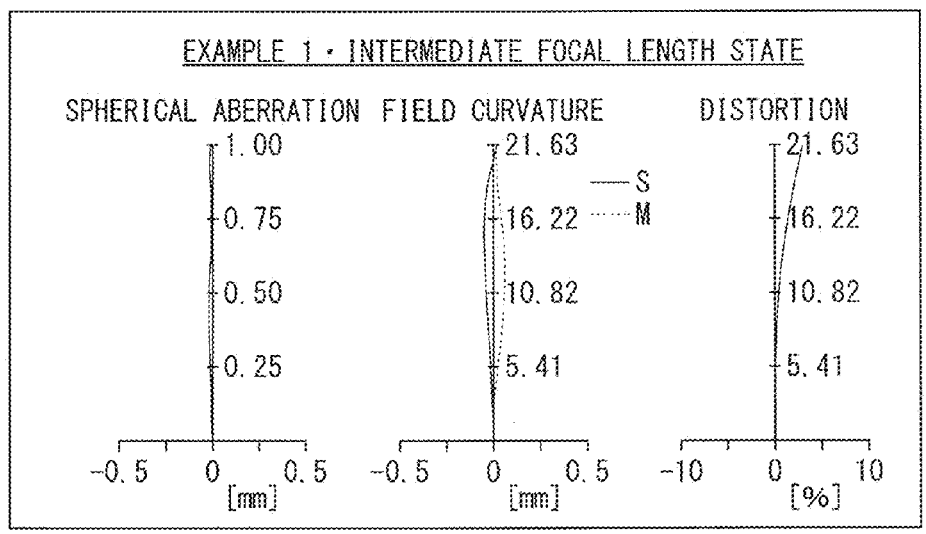
FIG. 3 is an aberration diagram illustrating various aberrations in an intermediate focal length state in Numerical example 1 in which specific numerical values are applied to the zoom lens shown in FIG. 1.
Figure 4:
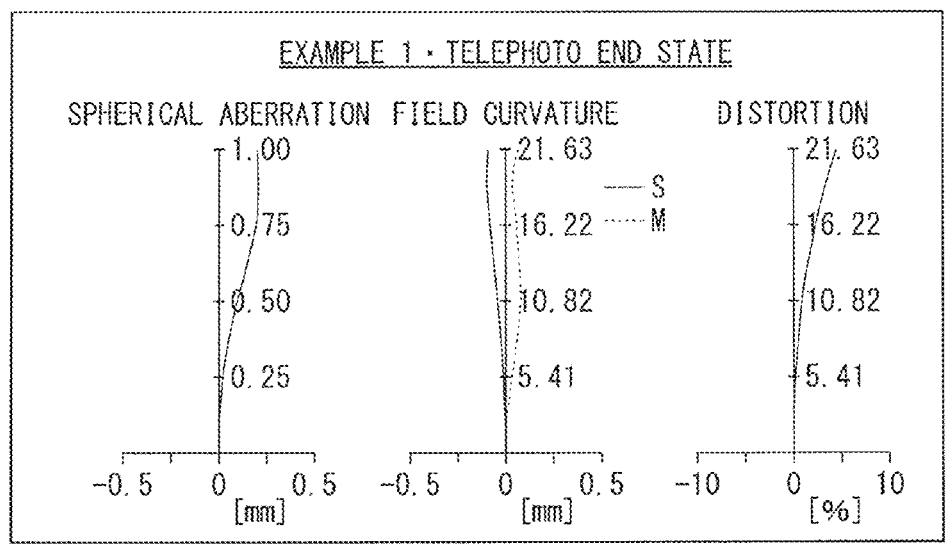
FIG. 4 is an aberration diagram illustrating various aberrations in a telephoto end state in Numerical example 1 in which specific numerical values are applied to the zoom lens shown in FIG. 1.

FIGS. 2 to 4 illustrate various aberrations in the above-described Numerical example 1. FIGS. 2, 3, and 4 illustrate the various aberrations in the wide end state, in the intermediate focal length state, and in the telephoto end state, respectively. FIGS. 2 to 4 each illustrate spherical aberration, astigmatism (field curvature), and distortion as the various aberrations. Each of the aberration diagrams shows aberrations based on the d-line (having a wavelength of 587.6 nm) as a reference wavelength. In the aberration diagrams showing the field curvature in FIGS. 2 to 4, a solid line (S) indicates a value of aberration in sagittal image plane and a dashed line (M) indicates a value of aberration in meridional image plane.

As can be clearly seen from the above-mentioned aberration diagrams, the various aberrations are favorably corrected and superior optical performance is achieved.

Numerical Example 2

In the zoom lens 2 shown in FIG. 2, the first lens group GR1 is configured of a negative meniscus lens G1 having a convex surface facing toward the object side, a negative biconcave lens G2, and a positive meniscus lens G3 having a convex surface facing toward the object side that are arranged in order from the object side toward the image side. The second lens group GR2 is configured of a positive biconvex lens G4, a cemented lens configured of a positive biconvex lens G5 and a negative biconcave lens G6 cemented to each other, a positive meniscus lens G7 having a convex surface facing toward the image side, and a positive meniscus lens G8 having a convex surface facing toward the object side that are arranged in order from the object side toward the image side. The third lens group GR3 is configured of a negative biconcave lens G9. The fourth lens group GR4 is configured of a positive meniscus lens having a convex surface facing toward the image side. A filter FL is arranged between the fourth lens group GR4 and the image plane IMG. The aperture stop S is arranged in the second lens group GR2. The aperture stop S travels together with the second lens group GR2 when the zooming operation is performed.

Table 5 shows lens data of Numerical example 2 in which specific numerical values are applied to the zoom lens 2. In the zoom lens 2, both surfaces (the 7th and 8th surfaces) of the positive lens G4 in the second lens group GR2, both surfaces (the 13th and 14th surfaces) of the positive lens G7, and both surfaces (the 17th and 18th surfaces) of the negative lens G9 in the third lens group GR3 are aspherical. The values of the 4th, 6th, 8th, and 10th aspherical surface coefficients A, B, C, and D of the above-mentioned aspherical surfaces are shown together with the value of the conic constant κ in Table 6.

Table 7 shows values of the total focal length f of the lens system, the F number Fno, and the half angle of view ω in each of the wide end state, the intermediate focal length state, and the telephoto end state. In the zoom lens 2, a spacing D6 between the first lens group GR1 and the second lens group GR2 varies when the zooming operation from the wide end to the telephoto end is performed. Also, a spacing D16 between the second lens group GR2 and the third lens group GR3 varies. Also, a spacing D18 between the third lens group GR3 and the fourth lens group GR4 varies. Table 8 shows the above-mentioned variable spacings together with the total focal length f of the lens system in the wide end state, the intermediate focal length state, and the telephoto end state.

TABLE 5

Example 2

| Lens group | Surface number | Curvature radius | Spacing | Refractive index | Abbe number |
|---|---|---|---|---|---|
| GR1 | 1 | 40.2348 | 1.500 | 1.83480 | 42.72 |
| | 2 | 19.0820 | 8.545 | | |
| | 3 | −141.7044 | 1.000 | 1.83480 | 42.72 |
| | 4 | 85.0798 | 1.551 | | |
| | 5 | 34.2084 | 2.378 | 1.92290 | 20.88 |
| | 6 | 60.0000 | (D6) | | |
| GR2 | 7 (ASP) | 23.7559 | 4.293 | 1.69350 | 53.20 |
| | 8 (ASP) | −51.0373 | 3.000 | | |
| | 9 (STO) | ∞ | 1.200 | | |
| | 10 | 121.7331 | 2.756 | 1.49700 | 81.61 |
| | 11 | −22.2286 | 0.900 | 1.69900 | 30.05 |
| | 12 | 25.2388 | 4.802 | | |
| | 13 (ASP) | −111.8307 | 1.938 | 1.68890 | 31.16 |
| | 14 (ASP) | −25.0042 | 1.000 | | |
| | 15 | 44.8825 | 1.767 | 1.48750 | 70.44 |
| | 16 | 549.6030 | (D16) | | |
| GR3 | 17 (ASP) | −160.8511 | 0.800 | 1.80610 | 40.73 |
| | 18 (ASP) | 34.5945 | (D18) | | |
| GR4 | 19 | −53.5947 | 3.066 | 1.60340 | 38.01 |
| | 20 | −29.9041 | 29.170 | | |
| FL | 21 | ∞ | 2.500 | 1.51680 | 64.20 |
| | 22 | ∞ | 1.000 | | |

TABLE 6

Example 2

| Surface number | κ | A | B | C | D |
|---|---|---|---|---|---|
| 7 | 0.00000E+00 | −5.91713E−06 | −3.45224E−08 | 7.51461E−11 | 0.00000E+00 |
| 8 | 0.00000E+00 | 1.35181E−05 | −5.03102E−08 | 1.58308E−10 | 0.00000E+00 |
| 13 | 0.00000E+00 | −1.93976E−05 | −2.15483E−07 | 9.58677E−11 | 0.00000E+00 |
| 14 | 0.00000E+00 | −2.07863E−05 | −1.63364E−07 | −2.71830E−10 | 0.00000E+00 |
| 17 | 0.00000E+00 | 5.48192E−06 | 8.29617E−09 | 9.30925E−11 | 0.00000E+00 |
| 18 | 0.00000E+00 | 2.07190E−05 | −6.21698E−08 | 1.69011E−10 | 0.00000E+00 |

TABLE 7

Example 2

| | Wide end state | Intermediate focal length state | Telephoto end state |
|---|---|---|---|
| f | 28.81 | 43.48 | 72.70 |
| Fno | 3.60 | 4.30 | 5.78 |
| ω | 36.91 | 26.45 | 16.57 |

TABLE 8

Example 2

| | Wide end state | Intermediate focal length state | Telephoto end state |
|---|---|---|---|
| f | 28.81 | 43.48 | 72.70 |
| D6 | 33.894 | 15.164 | 1.200 |
| D16 | 2.998 | 7.352 | 13.848 |
| D18 | 4.942 | 9.318 | 21.194 |

Figure 6:
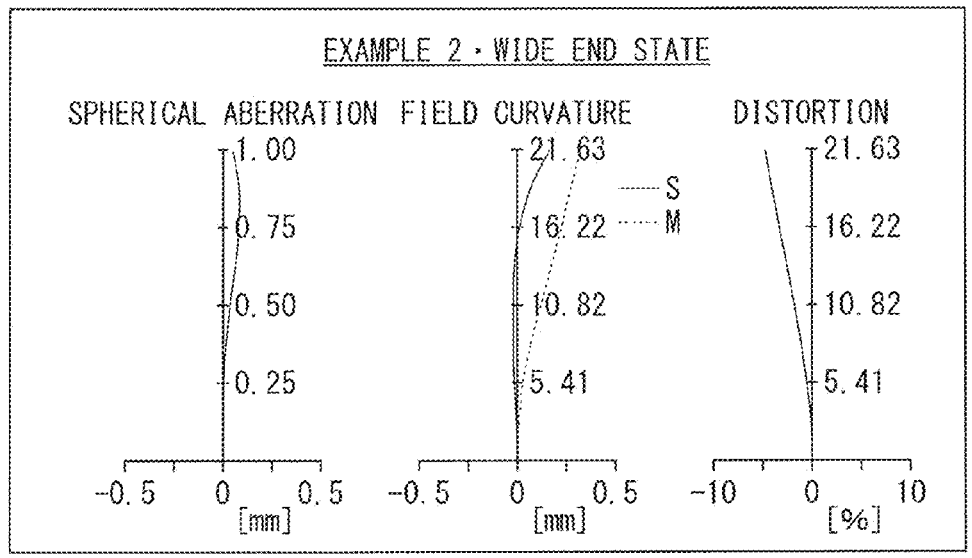
FIG. 6 is an aberration diagram illustrating various aberrations in a wide end state in Numerical example 2 in which specific numerical values are applied to the zoom lens shown in FIG. 5.
Figure 7:
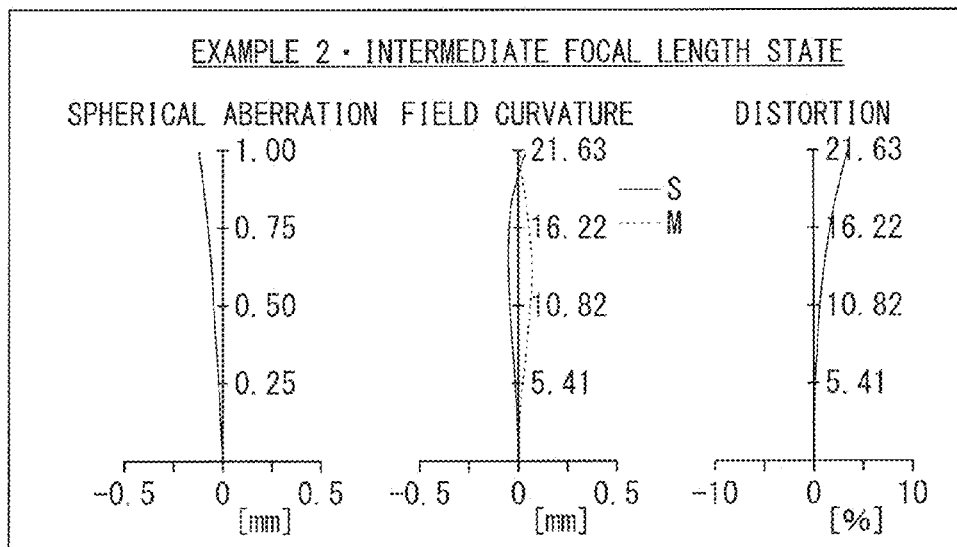
FIG. 7 is an aberration diagram illustrating various aberrations in an intermediate focal length state in Numerical example 2 in which specific numerical values are applied to the zoom lens shown in FIG. 5.
Figure 8:
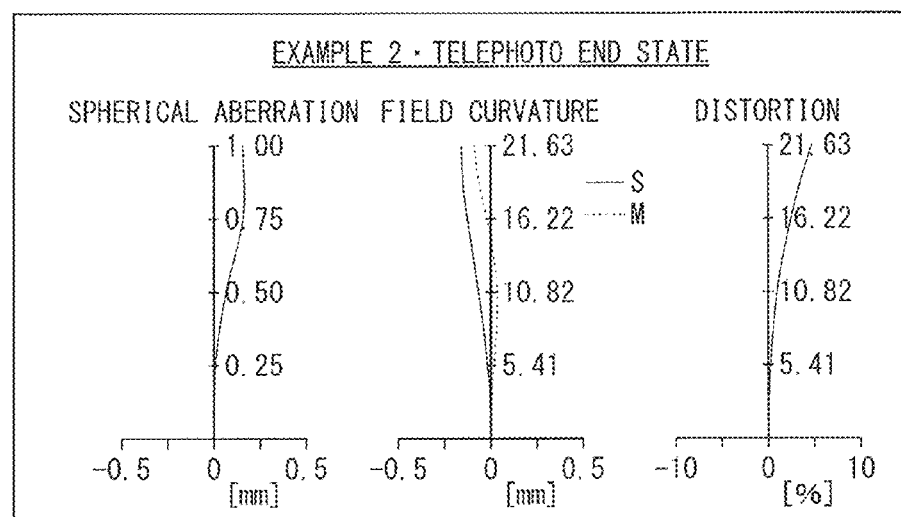
FIG. 8 is an aberration diagram illustrating various aberrations in a telephoto end state in Numerical example 2 in which specific numerical values are applied to the zoom lens shown in FIG. 5.

FIGS. 6 to 8 illustrate various aberrations in the above-described Numerical example 2. FIGS. 6, 7, and 8 illustrate the various aberrations in the wide end state, in the intermediate focal length state, and in the telephoto end state, respectively. FIGS. 6 to 8 each illustrate spherical aberration, astigmatism (field curvature), and distortion as the various aberrations. Each of the aberration diagrams shows aberrations based on the d-line (having a wavelength of 587.6 nm) as a reference wavelength. In the aberration diagrams showing the field curvature in FIGS. 6 to 8, a solid line (S) indicates a value of aberration in sagittal image plane and a dashed line (M) indicates a value of aberration in meridional image plane.

As can be clearly seen from the above-mentioned aberration diagrams, the various aberrations are favorably corrected and superior optical performance is achieved.

Numerical Example 3

In the zoom lens 3 shown in FIG. 9, the first lens group GR1 is configured of a negative meniscus lens G1 having a convex surface facing toward the object side, a negative biconcave lens G2, and a positive meniscus lens G3 having a convex surface facing toward the object side that are arranged in order from the object side toward the image side. The second lens group GR2 is configured of a positive biconvex lens G4, a cemented lens configured of a positive biconvex lens G5 and a negative biconcave lens G6 cemented to each other, and a positive biconvex lens G7 that are arranged in order from the object side toward the image side. The third lens group GR3 is configured of a negative meniscus lens G8 having a convex surface facing toward the object side. The fourth lens group GR4 is configured of a positive meniscus lens G9 having a convex surface facing toward the image side. A filter FL is arranged between the fourth lens group GR4 and the image plane IMG. The aperture stop S is arranged in the second lens group GR2. The aperture stop S travels together with the second lens group GR2 when the zooming operation is performed.

Table 9 shows lens data of Numerical example 3 in which specific numerical values are applied to the zoom lens 3. In the zoom lens 3, both surfaces (the 7th and 8th surfaces) of the positive lens G4 in the second lens group GR2, both surfaces (the 13th and 14th surfaces) of the positive lens G7, and both surfaces (the 15th and 16th surfaces) of the negative lens G8 in the third lens group GR3 are aspherical. The values of the 4th, 6th, 8th, and 10th aspherical surface coefficients A, B, C, and D of the above-mentioned aspherical surfaces are shown together with the value of the conic constant κ in Table 10.

Table 11 shows values of the total focal length f of the lens system, the F number Fno, and the half angle of view to in each of the wide end state, the intermediate focal length state, and the telephoto end state. In the zoom lens 3, a spacing D6 between the first lens group GR1 and the second lens group GR2 varies when the zooming operation from the wide end to the telephoto end is performed. Also, a spacing D14 between the second lens group GR2 and the third lens group GR3 varies. Also, a spacing D16 between the third lens group GR3 and the fourth lens group GR4 varies. Table 12 shows the above-mentioned variable spacings together with the total focal length f of the lens system in the wide end state, the intermediate focal length state, and the telephoto end state.

TABLE 9

Example 3

| Lens group | Surface number | Curvature radius | Spacing | Refractive index | Abbe number |
|---|---|---|---|---|---|
| GR1 | 1 | 37.8150 | 1.500 | 1.83480 | 42.72 |
| | 2 | 19.6849 | 8.014 | | |
| | 3 | −182.7875 | 1.000 | 1.83480 | 42.72 |
| | 4 | 52.1342 | 2.453 | | |
| | 5 | 35.4326 | 2.471 | 1.92290 | 20.88 |
| | 6 | 70.5496 | (D6) | | |
| GR2 | 7 (ASP) | 23.3136 | 3.212 | 1.61880 | 63.85 |
| | 8 (ASP) | −138.5374 | 4.705 | | |
| | 9 (STO) | ∞ | 1.200 | | |
| | 10 | 17.7620 | 2.863 | 1.49700 | 81.61 |
| | 11 | 398.8618 | 0.900 | 1.64770 | 33.84 |
| | 12 | 14.7952 | 2.500 | | |
| | 13 (ASP) | 31.0267 | 2.356 | 1.58310 | 59.46 |
| | 14 (ASP) | −67.3355 | (D14) | | |
| GR3 | 15 (ASP) | 785.3945 | 0.800 | 1.80610 | 40.73 |
| | 16 (ASP) | 26.5095 | (D16) | | |
| GR4 | 17 | −50.0000 | 2.498 | 1.75520 | 27.53 |
| | 18 | −29.9300 | 28.736 | | |
| FL | 19 | ∞ | 2.500 | 1.51680 | 64.20 |
| | 20 | ∞ | 1.000 | | |

TABLE 10

Example 3

| Surface number | κ | A | B | C | D |
|---|---|---|---|---|---|
| 7 | 0.00000E+00 | −3.29958E−06 | −4.71983E−08 | 3.20268E−10 | 0.00000E+00 |
| 8 | 0.00000E+00 | 6.88211E−06 | −3.44571E−08 | 2.73628E−10 | 0.00000E+00 |
| 13 | 0.00000E+00 | 1.09085E−06 | −3.76634E−08 | 2.22902E−09 | 0.00000E+00 |
| 14 | 0.00000E+00 | 8.39798E−06 | −3.39205E−08 | 2.61502E−09 | 0.00000E+00 |
| 15 | 0.00000E+00 | −8.84129E−07 | −1.40356E−07 | 6.57400E−10 | 0.00000E+00 |
| 16 | 0.00000E+00 | 1.47472E−05 | −2.44386E−07 | 8.71160E−10 | 0.00000E+00 |

TABLE 11

Example 3

| | Wide end state | Intermediate focal length state | Telephoto end state |
|---|---|---|---|
| f | 28.81 | 43.29 | 67.89 |
| Fno | 3.61 | 4.33 | 5.61 |
| ω | 36.90 | 26.55 | 17.67 |

TABLE 12

Example 3

| | Wide end state | Intermediate focal length state | Telephoto end state |
|---|---|---|---|
| f | 28.81 | 43.29 | 67.89 |
| D6 | 30.409 | 13.122 | 1.200 |
| D14 | 3.002 | 7.340 | 13.318 |
| D16 | 7.194 | 10.830 | 19.206 |

Figure 10:
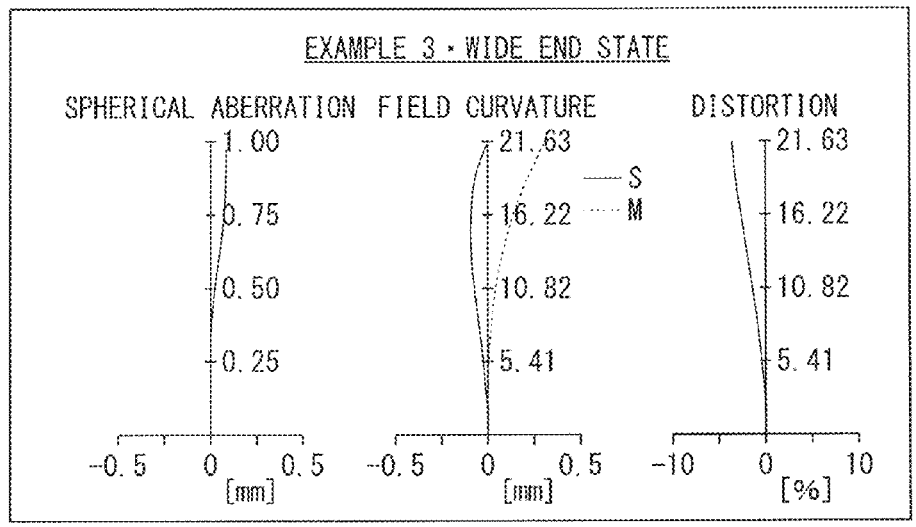
FIG. 10 is an aberration diagram illustrating various aberrations in a wide end state in Numerical example 3 in which specific numerical values are applied to the zoom lens shown in FIG. 9.
Figure 11:
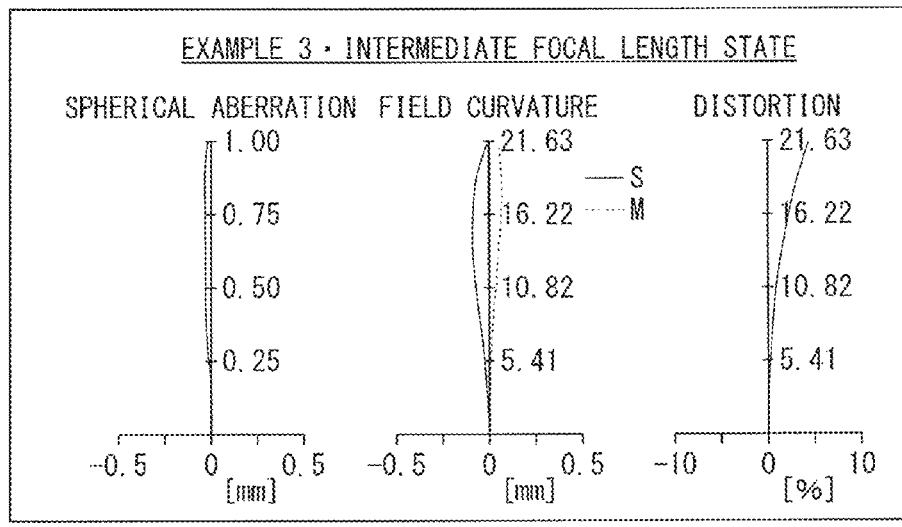
FIG. 11 is an aberration diagram illustrating various aberrations in an intermediate focal length state in Numerical example 3 in which specific numerical values are applied to the zoom lens shown in FIG. 9.
Figure 12:
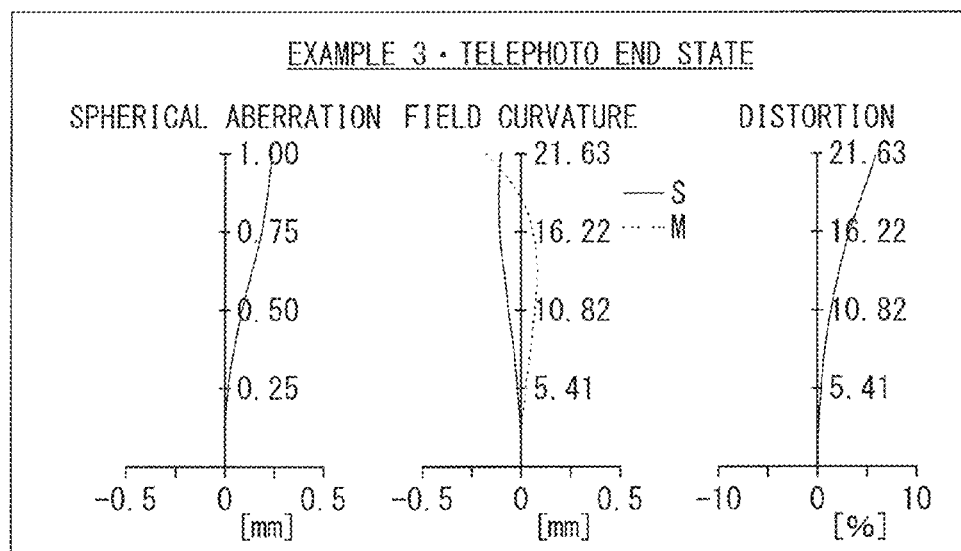
FIG. 12 is an aberration diagram illustrating various aberrations in a telephoto end state in Numerical example 3 in which specific numerical values are applied to the zoom lens shown in FIG. 9.

FIGS. 10 to 12 illustrate various aberrations in the above-described Numerical example 3. FIGS. 10, 11, and 12 illustrate the various aberrations in the wide end state, in the intermediate focal length state, and in the telephoto end state, respectively. FIGS. 10 to 12 each illustrate spherical aberration, astigmatism (field curvature), and distortion as the various aberrations. Each of the aberration diagrams shows aberrations based on the d-line (having a wavelength of 587.6 nm) as a reference wavelength. In the aberration diagrams showing the field curvature in FIGS. 10 to 12, a solid line (S) indicates a value of aberration in sagittal image plane and a dashed line (M) indicates a value of aberration in meridional image plane.

As can be clearly seen from the above-mentioned aberration diagrams, the various aberrations are favorably corrected and superior optical performance is achieved.

Numerical Example 4

In the zoom lens 4 shown in FIG. 13, the first lens group GR1 is configured of a negative meniscus lens G1 having a convex surface facing toward the object side, a negative biconcave lens G2, and a positive meniscus lens G3 having a convex surface facing toward the object side that are arranged in order from the object side toward the image side. The second lens group GR2 is configured of a positive biconvex lens G4, a cemented lens configured of a positive biconvex lens G5 and a negative biconcave lens G6 cemented to each other, and a positive biconvex lens G7 that are arranged in order from the object side toward the image side. The third lens group GR3 is configured of a negative biconcave lens G8.

The fourth lens group GR4 is configured of a positive meniscus lens G9 having a convex surface facing toward the image side. A filter FL is arranged between the fourth lens group GR4 and the image plane IMG. The aperture stop S is arranged in the second lens group GR2. The aperture stop S travels together with the second lens group GR2 when the zooming operation is performed.

Table 13 shows lens data of Numerical example 4 in which specific numerical values are applied to the zoom lens 4. In the zoom lens 4, both surfaces (the 7th and 8th surfaces) of the positive lens G4 in the second lens group GR2, both surfaces (the 13th and 14th surfaces) of the positive lens G7, and an image-sided surface (the 16th surface) of the negative lens G8 in the third lens group GR3 are aspherical. The values of the 4th, 6th, 8th, and 10th aspherical surface coefficients A, B, C, and D of the above-mentioned aspherical surfaces are shown together with the value of the conic constant κ in Table 14.

Table 15 shows values of the total focal length f of the lens system, the F number Fno, and the half angle of view ω in each of the wide end state, the intermediate focal length state, and the telephoto end state. In the zoom lens 4, a spacing D6 between the first lens group GR1 and the second lens group GR2 varies when the zooming operation from the wide end to the telephoto end is performed. Also, a spacing D14 between the second lens group GR2 and the third lens group GR3 varies. Also, a spacing D16 between the third lens group GR3 and the fourth lens group GR4 varies. Table 16 shows the above-mentioned variable spacings together with the total focal length f of the lens system in the wide end state, the intermediate focal length state, and the telephoto end state.

TABLE 13

Example 4

| Lens group | Surface number | Curvature radius | Spacing | Refractive index | Abbe number |
|---|---|---|---|---|---|
| GR1 | 1 | 34.0816 | 1.500 | 1.83480 | 42.72 |
| | 2 | 18.3083 | 8.527 | | |
| | 3 | −130.0576 | 1.000 | 1.74400 | 44.72 |
| | 4 | 47.1173 | 1.619 | | |
| | 5 | 31.3904 | 2.503 | 1.92290 | 20.88 |
| | 6 | 57.9296 | (D6) | | |
| GR2 | 7 (ASP) | 21.2750 | 3.573 | 1.58310 | 59.46 |
| | 8 (ASP) | −91.5125 | 3.432 | | |
| | 9 (STO) | ∞ | 1.200 | | |
| | 10 | 22.7124 | 3.075 | 1.49700 | 81.61 |
| | 11 | −50.8068 | 0.900 | 1.63980 | 34.57 |
| | 12 | 16.8378 | 3.965 | | |
| | 13 (ASP) | 29.9134 | 2.500 | 1.58310 | 59.46 |
| | 14 (ASP) | −58.0071 | (D14) | | |
| GR3 | 15 | −275.9198 | 0.800 | 1.69350 | 53.20 |
| | 16 (ASP) | 27.6960 | (D16) | | |
| GR4 | 17 | −41.2519 | 3.120 | 1.74950 | 35.04 |
| | 18 | −27.9283 | 30.521 | | |
| FL | 19 | ∞ | 2.500 | 1.51680 | 64.20 |
| | 20 | ∞ | 1.000 | | |

TABLE 14

Example 4

| Surface number | κ | A | B | C | D |
|---|---|---|---|---|---|
| 7 | 0.00000E+00 | −3.98377E−06 | −5.79927E−08 | 4.30524E−10 | 0.00000E+00 |
| 8 | 0.00000E+00 | 1.00321E−05 | −4.12693E−08 | 3.39391E−10 | 0.00000E+00 |
| 13 | 0.00000E+00 | 2.63642E−05 | −3.31405E−07 | 1.10828E−08 | 0.00000E+00 |
| 14 | 0.00000E+00 | 3.68743E−05 | −3.76569E−07 | 1.27129E−08 | 0.00000E+00 |
| 16 | 0.00000E+00 | 2.00869E−05 | −1.53748E−07 | 6.54544E−10 | 0.00000E+00 |

TABLE 15

Example 4

| | Wide end state | Intermediate focal length state | Telephoto end state |
|---|---|---|---|
| f | 28.82 | 44.26 | 67.90 |
| Fno | 3.59 | 4.50 | 5.74 |
| ω | 36.90 | 26.05 | 17.67 |

TABLE 16

Example 4

| | Wide end state | Intermediate focal length state | Telephoto end state |
|---|---|---|---|
| f | 28.82 | 44.26 | 67.90 |
| D6 | 28.668 | 11.704 | 1.200 |
| D14 | 2.990 | 8.085 | 14.420 |
| D16 | 4.959 | 8.477 | 16.115 |

Figure 14:
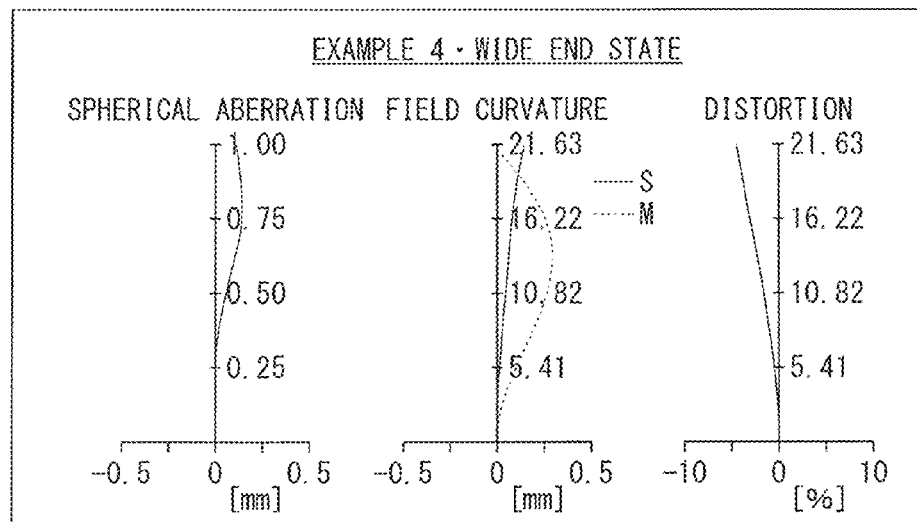
FIG. 14 is an aberration diagram illustrating various aberrations in a wide end state in Numerical example 4 in which specific numerical values are applied to the zoom lens shown in FIG. 13.
Figure 15:
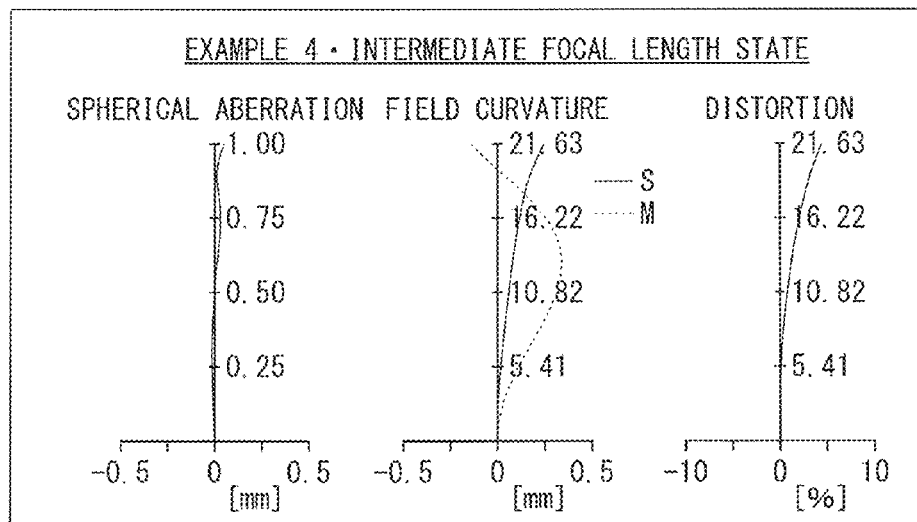
FIG. 15 is an aberration diagram illustrating various aberrations in an intermediate focal length state in Numerical example 4 in which specific numerical values are applied to the zoom lens shown in FIG. 13.
Figure 16:
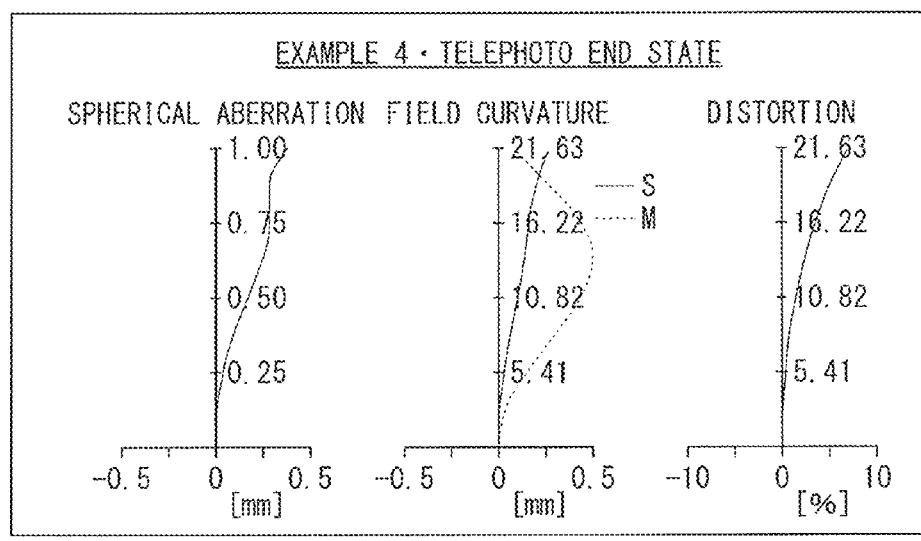
FIG. 16 is an aberration diagram illustrating various aberrations in a telephoto end state in Numerical example 4 in which specific numerical values are applied to the zoom lens shown in FIG. 13.

FIGS. 14 to 16 illustrate various aberrations in the above-described Numerical example 4. FIGS. 14, 15, and 16 illustrate the various aberrations in the wide end state, in the intermediate focal length state, and in the telephoto end state, respectively. FIGS. 14 to 16 each illustrate spherical aberration, astigmatism (field curvature), and distortion as the various aberrations. Each of the aberration diagrams shows aberrations based on the d-line (having a wavelength of 587.6 nm) as a reference wavelength. In the aberration diagrams showing the field curvature in FIGS. 14 to 16, a solid line (S) indicates a value of aberration in sagittal image plane and a dashed line (M) indicates a value of aberration in meridional image plane.

As can be clearly seen from the above-mentioned aberration diagrams, the various aberrations are favorably corrected and superior optical performance is achieved.

Other Numerical Data in Numerical Examples

Table 17 shows summary of values related to the above-described conditional expressions for each of the numerical examples. As can be seen from Table 17, the values in each of the numerical examples are within their numerical range in the respective conditional expressions.

TABLE 17

| Expression number | Element in conditional expression | Example 1 | Example 2 | Example 3 | Example 4 |
|---|---|---|---|---|---|
| | R1a | 38.7524 | 40.2348 | 37.8150 | 34.0816 |
| | R1b | 19.0709 | 19.0820 | 19.6849 | 18.3083 |
| | R4a | −59.1078 | −53.5947 | −50.0000 | −41.2519 |
| | R4b | −31.9500 | −29.9041 | −29.9300 | −27.9283 |
| (1) | (R1a + R1b)/(R1a − R1b) | 2.94 | 2.80 | 3.17 | 3.32 |
| (2) | (R4a + R4b)/(R4a − R4b) | 3.35 | 3.52 | 3.98 | 5.19 |
| | f2 | 27.31 | 27.01 | 25.03 | 25.13 |
| | f3 | −35.52 | −35.05 | −33.85 | −36.09 |
| (3) | |f2/f3| | 0.77 | 0.77 | 0.74 | 0.70 |
| | f4 | 109.82 | 106.23 | 92.90 | 104.11 |
| (4) | |f3/f4| | 0.32 | 0.33 | 0.36 | 0.35 |
| | f1 | −38.28 | −37.73 | −36.86 | −34.80 |
| (5) | |f1/f2| | 1.40 | 1.40 | 1.47 | 1.38 |
| | Lmax | 115.00 | 115.00 | 109.31 | 108.35 |
| | Y | 21.633 | 21.633 | 21.633 | 21.633 |
| (5) | Lmax/Y | 5.32 | 5.32 | 5.05 | 5.01 |

[5. Other Embodiments]

The technology according to the present disclosure is not limited to the description of the above embodiments and Examples, and various modifications may be made.

For example, the shapes of the respective sections and the numerical values shown in the above-described numerical examples are mere specific examples for carrying out the present technology, and the technical scope of the present technology should not be limitedly understood based thereon.

Moreover, in the above-described embodiments and Examples, description has been given of the configuration substantially configured of four lens groups. However, there may be adopted a configuration that further includes a lens having substantially no refractive power.

It is possible to achieve at least the following configurations from the above-described example embodiments and the modifications of the present technology.

[1] A zoom lens including:
 a first lens group having negative refractive power and including a plurality of negative lenses;
 a second lens group having positive refractive power;
 a third lens group having negative refractive power; and
 a fourth lens group having positive refractive power and configured of one positive lens, the first to fourth lens groups being arranged in order from an object side toward an image side, wherein
 a zooming operation from wide end to telephoto end allows the first to third lens groups to travel along an optical axis, and allows the fourth lens group to be fixed,
 a focusing operation allows the third lens group to travel along the optical axis, and the following conditional expressions are satisfied, $$1<(R1a+R1b)/(R1a-R1b)<5 \qquad (1)$$

$$2<(R4a+R4b)/(R4a-R4b)<7 \qquad (2)$$

where R1$a$ is a curvature radius on the object side of a most-object-sided negative lens in the first lens group, R1$b$ is a curvature radius on the image side of the most-object-sided negative lens in the first lens group, R4$a$ is a curvature radius on the object side of the positive lens in the fourth lens group, and R4$b$ is a curvature radius on the image side of the positive lens in the fourth lens group.

[2] The zoom lens according to [1], wherein the following conditional expression is satisfied, $$0.5<|f2/f3|<0.9 \qquad (3)$$

where f2 is a focal length of the second lens group, and f3 is a focal length of the third lens group.

[3] The zoom lens according to [1] or [2], wherein the following conditional expression is satisfied, $$0.2<|f3/f4|<0.6 \qquad (4)$$

where f4 is a focal length of the fourth lens group.

[4] The zoom lens according to any one of [1] to [3], wherein the following conditional expression is satisfied, $$1<|f1/f2|<2 \qquad (5)$$

where f1 is a focal length of the first lens group.

[5] The zoom lens according to any one of [1] to [4], wherein the third lens group is configured of one negative lens.

[6] The zoom lens according to any one of [1] to [5], further including an aperture in the second lens group, the aperture being configured to adjust a light amount.

[7] The zoom lens according to any one of [1] to [6], wherein all of lens surfaces of the positive lens in the fourth lens group are spherical.

[8] The zoom lens according to any one of [1] to [7], wherein all of lens surfaces in the first lens group are spherical.

[9] The zoom lens according to any one of [1] to [8], wherein the first lens group is configured of a first negative lens, a second negative lens, and a positive lens that are arranged in order from the object side toward the image side.

[10] The zoom lens according to any one of [1] to [9], wherein the following conditional expression is satisfied, $$3<Lmax/Y<7 \qquad (6)$$

where Lmax is a maximum value of a total length of the zoom lens in a range from a wide end state to a telephoto end state, and Y is a maximum image height.

[11] The zoom lens according to any one of [1] to [10], further including a lens having substantially no refractive power.

[12] An imaging apparatus including:
a zoom lens; and
an imaging device configured to output an imaging signal based on an optical image formed by the zoom lens,
the zoom lens including
a first lens group having negative refractive power and including a plurality of negative lenses,
a second lens group having positive refractive power,
a third lens group having negative refractive power, and
a fourth lens group having positive refractive power and configured of one positive lens, the first to fourth lens groups being arranged in order from an object side toward an image side, wherein a zooming operation from wide end to telephoto end allows the first to third lens groups to travel along an optical axis, and allows the fourth lens group to be fixed, a focusing operation allows the third lens group to travel along the optical axis, and the following conditional expressions are satisfied, $$1<(R1a+R1b)/(R1a-R1b)<5 \qquad (1)$$

$$2<(R4a+R4b)/(R4a-R4b)<7 \qquad (2)$$

where R1$a$ is a curvature radius on the object side of a most-object-sided negative lens in the first lens group, R1$b$ is a curvature radius on the image side of the most-object-sided negative lens in the first lens group, R4$a$ is a curvature radius on the object side of the positive lens in the fourth lens group, and R4$b$ is a curvature radius on the image side of the positive lens in the fourth lens group.

[13] The imaging apparatus according to [12], wherein the zoom lens further includes a lens having substantially no refractive power.

It should be understood by those skilled in the art that various modifications, combinations, sub-combinations, and alterations may occur depending on design requirements and other factors insofar as they are within the scope of the appended claims or the equivalents thereof.

What is claimed is:

1. A zoom lens comprising:
a first lens group having negative refractive power and including a plurality of negative lenses;
a second lens group having positive refractive power;
a third lens group having negative refractive power; and
a fourth lens group having positive refractive power and configured of one positive lens, the first to fourth lens groups being arranged in order from an object side toward an image side, wherein a zooming operation from wide end to telephoto end allows the first to third lens groups to travel along an optical axis, and allows the fourth lens group to be fixed, a focusing operation allows the third lens group to travel along the optical axis, and the following conditional expressions are satisfied, $$1<(R1a+R1b)/(R1a-R1b)<5 \qquad (1)$$

$$2<(R4a+R4b)/(R4a-R4b)<7 \qquad (2)$$

$$0.2<|f3/f4|<0.6 \qquad (4)$$

where f4 is a focal length of the fourth lens group,

R1$a$ is a curvature radius on the object side of a most-object-sided negative lens in the first lens group, R1$b$ is a curvature radius on the image side of the most-object-sided negative lens in the first lens group, R4$a$ is a curvature radius on the object side of the positive lens in the fourth lens group, and R4$b$ is a curvature radius on the image side of the positive lens in the fourth lens group.

2. The zoom lens according to claim 1, wherein the following conditional expression is satisfied, $$0.5<|f2/f3|<0.9 \qquad (3)$$

where f2 is a focal length of the second lens group, and f3 is a focal length of the third lens group.

3. The zoom lens according to claim 1, wherein the following conditional expression is satisfied, $$1<|f1/f2|<2 \qquad (5)$$

where f1 is a focal length of the first lens group.

4. The zoom lens according to claim 1, wherein the third lens group is configured of one negative lens.

5. The zoom lens according to claim 1, further comprising an aperture in the second lens group, the aperture being configured to adjust a light amount.

6. The zoom lens according to claim 1, wherein all of lens surfaces of the positive lens in the fourth lens group are spherical.

7. The zoom lens according to claim 1, wherein all of lens surfaces in the first lens group are spherical.

8. The zoom lens according to claim 1, wherein the first lens group is configured of a first negative lens, a second negative lens, and a positive lens that are arranged in order from the object side toward the image side.

9. The zoom lens according to claim 1, wherein the following conditional expression is satisfied, $$3 < L\max/Y < 7 \tag{6}$$

where Lmax is a maximum value of a total length of the zoom lens in a range from a wide end state to a telephoto end state, and Y is a maximum image height.

10. An imaging apparatus comprising:

a zoom lens; and an imaging device configured to output an imaging signal based on an optical image formed by the zoom lens, the zoom lens including a first lens group having negative refractive power and including a plurality of negative lenses, a second lens group having positive refractive power, a third lens group having negative refractive power, and a fourth lens group having positive refractive power and configured of one positive lens, the first to fourth lens groups being arranged in order from an object side toward an image side, wherein a zooming operation from wide end to telephoto end allows the first to third lens groups to travel along an optical axis, and allows the fourth lens group to be fixed, a focusing operation allows the third lens group to travel along the optical axis, and the following conditional expressions are satisfied, $$1 < (R1a + R1b)/(R1a - R1b) < 5 \tag{1}$$

$$2 < (R4a + R4b)/(R4a - R4b) < 7 \tag{2}$$

$$0.2 < |f3/f4| < 0.6 \tag{4}$$

where f4 is a focal length of the fourth lens group,

R1$a$ is a curvature radius on the object side of a most-object-sided negative lens in the first lens group, R1$b$ is a curvature radius on the image side of the most-object-sided negative lens in the first lens group, R4$a$ is a curvature radius on the object side of the positive lens in the fourth lens group, and R4$b$ is a curvature radius on the image side of the positive lens in the fourth lens group.

* * * * *